United States Patent [19]

Ayliffe et al.

[11] Patent Number: 5,522,000
[45] Date of Patent: May 28, 1996

US005522000A

[54] PROVIDING OPTICAL COUPLING WITH SINGLE CRYSTAL SUBSTRATE MOUNTED ELECTRO-OPTIC TRANSDUCERS

[75] Inventors: Peter J. Ayliffe, Stansted; James W. Parker, Bishop's Stortford; Paul M. Harrison, Chelmsford; Robert G. Peall, Harlow; Stefano Bertolini, Hatfield Heath; Martin C. Geear, Little Hadham, all of United Kingdom

[73] Assignee: Northern Telecom Limited, Montreal, Canada

[21] Appl. No.: 283,264

[22] Filed: Jul. 29, 1994

[30] Foreign Application Priority Data

Jul. 30, 1993 [GB] United Kingdom ............... 9315789

[51] Int. Cl.⁶ .................................................. G02B 6/42
[52] U.S. Cl. ............................. 385/88; 216/13; 385/49; 430/313
[58] Field of Search ..................... 385/88–94, 49; 156/625, 630; 430/313, 314, 316, 321; 216/13, 17–19, 24

[56] References Cited

U.S. PATENT DOCUMENTS

| | | | |
|---|---|---|---|
| 4,802,727 | 2/1989 | Stanley | 385/89 |
| 5,243,673 | 9/1993 | Johnson et al. | 385/90 |
| 5,333,225 | 7/1994 | Jacobowitz et al. | 385/93 |

FOREIGN PATENT DOCUMENTS

| | | |
|---|---|---|
| 2215087 | 9/1989 | United Kingdom . |
| 2255672 | 11/1992 | United Kingdom . |

Primary Examiner—John D. Lee
Attorney, Agent, or Firm—Lee, Mann, Smith, McWilliams, Sweeney & Ohlson

[57] ABSTRACT

A method of making a multilayer printed circuit upon a single crystal substrate for the mounting thereon of a semiconductor laser and an optical fibre pigtail located in a crystallographically etched groove in the substrate wherein all the photolithographic processing required to create the multilayer printed circuit is performed prior to the etching of the groove.

9 Claims, 1 Drawing Sheet

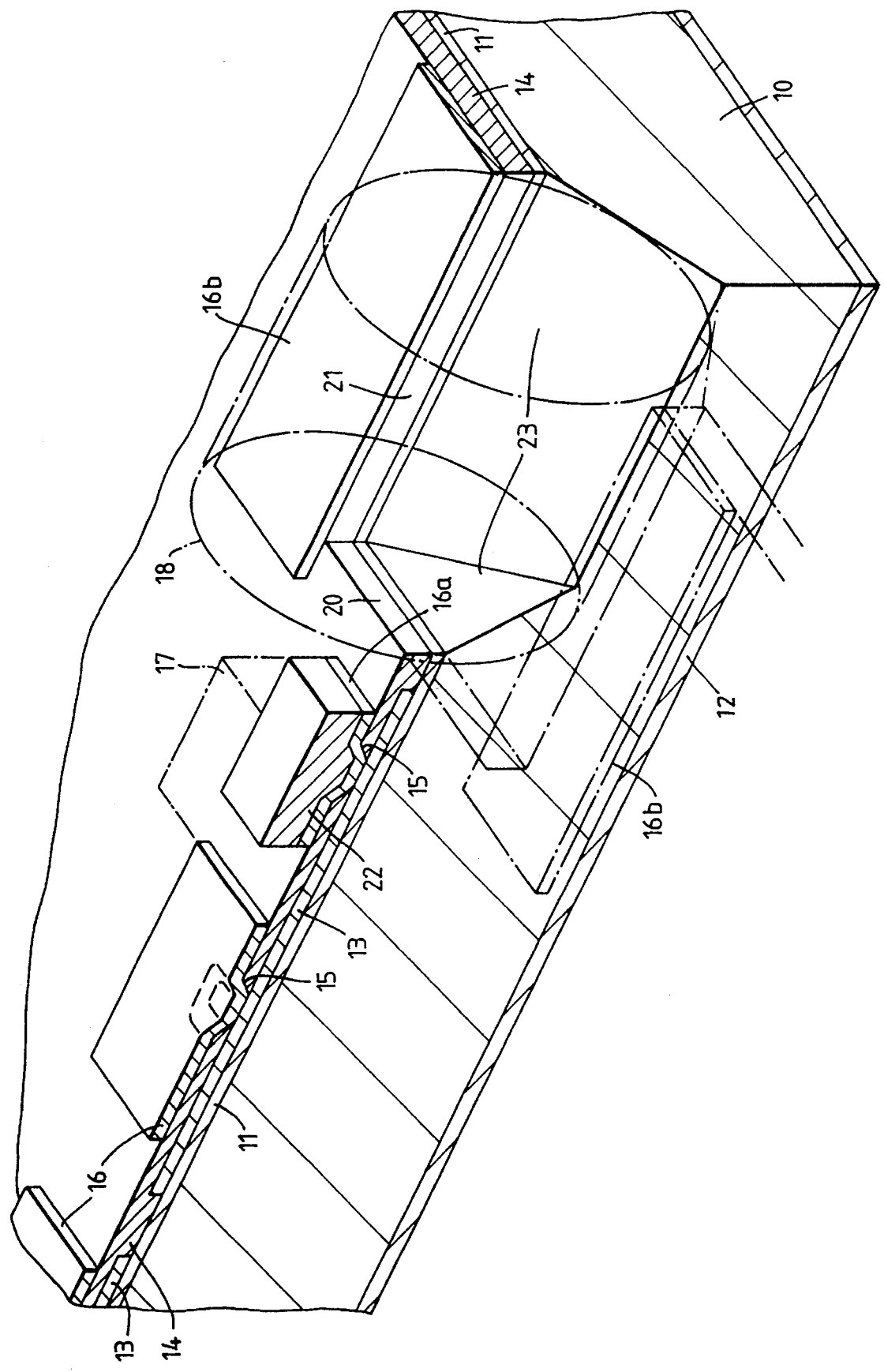

5,522,000

PROVIDING OPTICAL COUPLING WITH SINGLE CRYSTAL SUBSTRATE MOUNTED ELECTRO-OPTIC TRANSDUCERS

BACKGROUND TO THE INVENTION

This invention relates to the provision of optical coupling with an electro-optic transducer mounted on a single crystal substrate where at least part of that coupling is provided by an optical component located in a crystallographically etched groove or pit formed in the single crystal substrate. For the purpose of this specification the term crystallographic etching is defined to mean the type of etching in which a pit or groove is etched in a single crystal substrate and the depth of that pit or groove is determined by its width and by the fact that the etchant is employed under conditions in which it preferentially etches to specific crystal planes. Typically the optical component may be a ball lens mounted in an etch pit, or a graded index lens or the end of an optical fibre, mounted in an etched groove. A further example of an optical component that may be located in this way is an optical isolator. One of the advantages of this form of location of an optical component is the dimensional stability it is likely to afford in relation to the electro-optic transducer, and another is the precision of positioning it can afford.

An instance of the mounting of an optical fibre in a crystallographically etched Vee-groove in optical coupling relationship with an electro-optic transducer is described in GB 2,255,672A, to which attention is directed. In GB 2,255,672A there is described a method of making such an arrangement in which a photolithography process is used to define, and then anisotropically etch, a Vee-groove in a single crystal substrate. After the etching of the Vee-groove, further processing is employed to form a patterned electrically conductive ground plane covered with a dielectric layer of $SiO_2$, still further processing is then employed to provide vias in the dielectric layer, and to cover it with an electrically conductive layer that is patterned to provide a number of interconnects. On one of these interconnects is mounted an electro-optic transducer in the form of a laser diode.

The preferred photolithographic processing includes the provision of a solder-wettable pad upon which to mount the transducer, the shape of this pad being such as to match that of the transducer so that the transducer can be bonded in alignment by solder-bump soldering. In solder-bump soldering one component is soldered to another, typically a component to a substrate, in a manner that provides automatic alignment of the two components through the effects of surface tension. For this purpose the facing surfaces of the two components to be soldered are provided with solder-wettable pads of matching configuration, and between these facing pads is located a predetermined volume of solder. When the solder is melted one of the components is allowed to move freely with respect to the other under the forces of surface tension provided by the molten solder. This freedom of movement is retained while the solder is caused to resolidify.

SUMMARY OF THE INVENTION

Reliability and yield problems have been encountered in the implementation of this approach, and it has been discovered that these problems can be significantly ameliorated by altering the ordering of some of the processing steps.

According to the present invention there is provided a method of making a multilayer printed circuit on a single crystal substrate for the mounting thereon of at least one electro-optic transducer and at least one optical component, which printed circuit has a plurality of electrical conductors, which method includes the step of employing photolithographic processing to produce the configuration of all the electrical conductors of the printed circuit, and then the step of crystallographically etching at least one pit or groove in the single crystal substrate for the location therein of an optical component, the depth of which pit or groove has been photolithographically defined.

The invention also resides in hybrid circuits incorporating multilayer printed circuits made by the method defined in the preceding paragraph.

It is believed that a significant factor militating against reliability and yield in the prior art method of GB 2,255,672A, to which previous reference has been made, arises from the fact that the photolithographic processing required to create the electrical conductors of the multilayer circuit and the required inter-layer electrical insulation is performed on a substrate that is not substantially flat, but has one or more relatively deeply etched features in its surface. It is believed that these features interfere with high quality photolithographic processing by disrupting the smooth flow of photoresist materials, creating zones of differing thickness in the wake of the flow of resist in the neighbourhood of such features. Such absence of uniformity restricts the positioning and resolution of patterning obtainable from these photoresist layers.

In GB 2,215,087A, to which attention is also directed, there is described a method of providing passive alignment on a silicon substrate between a laser diode containing block secured to the substrate and a set of optical fibres located in Vee-grooves formed in that substrate. The Vee-grooves are not etched in the silicon substrate until after photolithographic processing has been employed to define the configuration of a single layer of electrical conductor tracks on the silicon, though the metal from which those actual conductor tracks is not deposited till after the etching of the Vee-grooves. A feature of this distinction is that the process is not adaptable to the provision of multilayer conductive tracks without having to have recourse to further photolithographic processing subsequent to the etching of the Vee-grooves.

A further disadvantage of the process is that it does not lend itself to the mounting of diode laser chips directed upon the silicon substrate in a manner providing passive alignment of the chip through the agency of surface tension effects in the molten solder used to bond the chip to the substrate. This is because an electrical contact will normally need to be made with at least one portion of the (face-down) bonded surface of that chip. This in turn means that the solder-wettable area on the substrate needs to extend beyond the perimeter of the laser diode chip in order to provide an external contact area to which to make electrical connection with the bonded face of the laser chip; but if the solder wettable area does so extend into an area beyond the perimeter, then at least a portion of that external area will be wetted by the molten solder, thereby giving rise to surface tension forces in the molten solder that tend to draw the chip out of alignment. Furthermore, the amount of additional wetting is somewhat indeterminate, and hence the compositional change in the solder induced by such wetting also becomes somewhat indeterminate. This, particularly in the case of gold tin solders, can adversely effect the flow properties (and hence passive alignment properties) of the molten solder. When using a silicon substrate with a multilayer printed circuit, these problems are readily avoidable by the expedient of employing a solder wettable pad configuration to match the corresponding configuration of the laser chip, and arranging to make electrical connection with this pad configuration by way of one or more buried electrical conductors within the multilayer printed circuit structure.

BRIEF DESCRIPTION OF THE DRAWING

There follows a description of the manufacture of a silicon hybrid circuit that includes a diode laser, the method of manufacture embodying the present invention in preferred form. The description refers to the accompanying drawing which depicts a longitudinally sectioned schematic perspective view of a portion of the hybrid.

DETAILED DESCRIPTION OF A PREFERRED EMBODIMENT

Referring to the drawing, a single crystal silicon slice 10 extending in a {100} plane is provided with passivation layers 11 and 12, for instance of silicon nitride, on its two major surfaces. If desired, the silicon nitride layer 11 on the top surface of the slice may itself be covered with a silica layer (not shown) provided for height adjustment purposes. Optionally the exposed surface of passivation layer 12 may be covered with a metallisation (not shown).

The next layer of the structure is a patterned interconnect layer 13 disposed on the passivation layer 11. Patterning is achieved by photolithography. Conveniently a lift-off process is used involving the deposition of a polymeric bi-layer (not shown) on the passivation layer 11, and the patterning and development of that bi-layer prior to the deposition of the material of the interconnect layer 13. The interconnect layer typically comprises a layer of gold sandwiched between two layers of titanium that are provided to promote adhesion between the interconnect layer and the dielectric material residing immediately above and below it.

After removal of the metal-coated patterned lift-off layer, the patterned interconnect layer 13 is covered with a dielectric layer 14 which may comprise a thin silicon nitride passivation layer covered by a thicker layer of silica. Such material may conveniently be deposited by plasma enhanced chemical vapour deposition. Standard photolithography is then used to etch vias 15 through this layer 14 to enable contact to be made in selected areas with different parts of the underlying interconnect layer 13. Reactive ion etching may be employed to etch through the dielectric material, followed by a wet etch to etch through the upper titanium layer of the interconnect layer, which is subject to oxidation, in order to expose the underlying gold.

Any residual photoresist remaining from the etching of the vias 15 is removed preparatory for the deposition of a patterned solder-wettable metallic pads layer 16. The patterning of the pads 16 may conveniently be achieved by a lift-off photolithographic process similar to that employed in the patterning of the interconnect layer 13. The pads may similarly consist of a sandwich of three layers, comprising in this instance a thin first layer of titanium provided for adhesion purposes, a second layer of platinum, and finally a third layer of gold.

Various components (all but one, a laser diode chip 17, not shown), both active and passive are later mounted on the wafer, and electrical connection between their terminals and respective pads 16 on the wafer are made for instance by solder-bumping, by wire bonding or by conductive epoxy bonding. One pad in particular, pad 16a is reserved for the mounting of the laser diode chip 17 by solder-bumping. Two further pads 16b are not used for any electrical connection purposes, but instead are used for masking purposes. These two pads 16b comprise a parallel pair of strips precisely positioned to define a stripe between their nearer edges that is aligned with the pad 16a.

The next stage of processing is processing preparatory for the crystallographic etching of a Vee-groove between the pads 16b in which to locate an optical fibre 18 so as to be in registry with the laser 17 later to be mounted on pad 16a. For this purpose a fresh layer of photolithographic masking material (not shown) is applied to the whole upper surface of the slice, and is developed to remove a portion thereof in the form of a stripe (not shown) that terminates just short of the ends of the strips 16b that are adjacent the pad 16a, and is somewhat wider than the distance separating the inner edges of the two strips 16b so that these inner edges are thereby exposed. Reactive Ion Etching (RIE) is then employed first to etch the exposed portion of the dielectric layer 14, and then the corresponding portion of the passivation layer 11 thereby exposed, to expose the underlying silicon 10. This reactive ion etching produces a vertical wall 20 whose location is defined by the boundary of the patterned photoresist and a pair of vertical walls 21 (only one illustrated) whose locations are respectively defined by the inner edges of the two stripes 16b.

The next step in the preferred processing sequence is therefore to follow the RIE immediately with further photolithography, conveniently bi-layer lift-off photolithography, to produce the requisite solder in the places required. For this photolithographic processing the two polymer layers (not shown) of the bi-layer are deposited, patterned and developed, and then a solder layer is deposited. Most of this solder layer is subsequently removed when the bi-layer is lifted off, but in the windows opened in this bi-layer by its patterning, such as a window registering with pad 16a, the solder remains after the lift-off as a solder pad 22. The solder is to be used for solder-bump alignment of the laser chip 17 that is to be mounted upon it, and a preferred solder for this purpose is a fluxless gold tin solder. This is deposited by evaporation as a multilayer stack of alternate gold and tin layers starting and finishing with layers of gold. Preferably the tin layers of the stack are individually subjected to ion bombardment so as to produce a denser deposit, and in consequence a solder layer with fewer voids, and hence better flow properties. In a typical example the solder composed a thirteen-layer stack having an aggregate thickness of about 5 µm. Such a layer is thick in comparison with the previous layers deposited by bi-layer photolithography, namely the interconnect layer 13 and the pads layer 16, and hence the first layer of the bi-layer may be a composite layer provided by two or more spinnings of liquid polymer instead of a single spinning.

After the bi-layer has been lifted off, a wet etch is employed that will preferentially etch the exposed silicon to {111} planes 23, two of which co-operate to form the Vee-groove that positions the fibre 18. This etch may for instance comprise ethylene diamine pyrocatecol (EDP) and piperizine.

Typically the slice 10 is diced up into individual hybrid chips prior to the mounting of any individual active or passive components on those chips. Protection of the hybrid surface during the dicing operation may be provided by the application to the slice of a polymer layer (not shown), which is removed subsequent to the dicing. This polymer layer may conveniently be a layer of photoresist applied to the slice by spraying. After removal of the polymer from an individual hybrid chip, it is ready for having its laser 17, optical fibre 18, and any other active and passive components (not shown), secured to it in position. The laser 17 is bonded in position using solder-bump technology, while the fibre 18 may be secured in its groove with adhesive, for instance epoxy. The fact that the photolithographic masking involved in obtaining solder pad 22 with the laser pad 16a is not governed by a self-alignment technique is not critical because any such misalignment is automatically rectified when the laser itself is secured in position by solder-bumping. On the other hand the control over the thickness of the various layers of the hybrid together with the fact that the pads 16a and 16b are defined by a single photolithographic masking operation means that a kind of self-alignment principle is involved in obtaining good precision of lateral (x, y) relative positioning between the fibre and the laser. The same precision is not obtained with respect to relative positioning in the axial (z) direction of the fibre but generally this is entirely acceptable because precision in positioning in the axial direction is much less critical so far as coupling efficiency is concerned.

If the hybrid circuit were to have been constructed with a crystallographically etched pit, in which to locate an optical element such as a ball lens, instead of the Vee-groove to house the optical fibre 18, then the place of the two strips 16 could have been taken by a single area of solder-wettable metal provided with a square window of defined size. In these circumstances the positioning in all three axial directions (x, y and z) would be achieved with a high degree of precision.

We claim:

1. A method of making a multilayer printed circuit on a single crystal substrate for the inserting thereon of at least one electrooptic transducer and at least one optical component, which printed circuit has a plurality of electrical conductors, which method includes the step of employing photolithographic processing to produce the configuration of all the electrical conductors of the printed circuit, and then the step of crystallographically etching at least one pit or groove in the single crystal substrate for the location therein of an optical component, the depth of which pit or groove has been photolithographically defined.

2. A method of making a multilayer printed circuit upon a single crystal substrate, which method is as claimed in claim 1, and includes the step of providing upon the substrate a solder-wettable pad, and the step of securing said transducer to the pad by solder bump soldering.

3. A method as claimed in claim 2, wherein solder for said soldering is applied to the pad as a composite gold/tin solder layer deposited thereon by the deposition of layers of gold and tin, wherein the tin is ion-bombarded during its deposition.

4. A hybrid circuit incorporating a multilayer printed circuit made by the method claimed in claim 1, and additionally incorporating at least one electro-optic transducer having an optical component optically coupled therewith and located in a crystallographically etched pit or groove formed in the single crystal substrate of the multilayer printed circuit by said method.

5. A hybrid circuit as claimed in claim 4, wherein the said electro-optic transducer is a semiconductor laser.

6. A hybrid circuit as claimed in claim 4, wherein said optical component is one end of an optical fibre.

7. A hybrid circuit incorporating a multilayer printed circuit made by the method claimed in claim 2, and additionally incorporating at least one electro-optic transducer having an optical component optically coupled therewith and located in a crystallographically etched pit or groove formed in the single crystal substrate of the multilayer printed circuit by said method.

8. A hybrid circuit as claimed in claim 7, wherein the said electro-optic transducer is a semiconductor laser.

9. A hybrid circuit as claimed in claim 8, wherein said optical component is one end of an optical fibre.

* * * * *